United States Patent
Zhang

(10) Patent No.: US 7,251,713 B1
(45) Date of Patent: Jul. 31, 2007

(54) SYSTEM AND METHOD TO TRANSPORT DATA SNAPSHOTS

(75) Inventor: Fumin Zhang, Eden Prairie, MN (US)

(73) Assignee: Xiotech Corporation, Eden Prairie, MN (US)

( * ) Notice: Subject to any disclaimer, the term of this patent is extended or adjusted under 35 U.S.C. 154(b) by 328 days.

(21) Appl. No.: 10/390,019

(22) Filed: Mar. 18, 2003

Related U.S. Application Data

(60) Provisional application No. 60/365,694, filed on Mar. 18, 2002.

(51) Int. Cl.
*G06F 12/16* (2006.01)
(52) U.S. Cl. .................. 711/162; 711/209; 709/227
(58) Field of Classification Search ............... 711/161, 711/162; 707/202, 204
See application file for complete search history.

(56) References Cited

U.S. PATENT DOCUMENTS

| | | | |
|---|---|---|---|
| 5,649,152 A * | 7/1997 | Ohran et al. ............... 711/114 |
| 6,035,412 A * | 3/2000 | Tamer et al. ............... 714/6 |
| 6,119,208 A | 9/2000 | White et al. |
| 6,182,198 B1 * | 1/2001 | Hubis et al. ............... 714/6 |
| 6,205,450 B1 | 3/2001 | Kanome |
| 6,212,531 B1 | 4/2001 | Blea et al. |
| 6,237,008 B1 * | 5/2001 | Beal et al. ............... 707/204 |
| 6,253,295 B1 | 6/2001 | Beal et al. |
| 6,446,176 B1 | 9/2002 | West et al. |
| 6,499,091 B1 | 12/2002 | Bergsten |
| 6,625,704 B2 | 9/2003 | Winokur |
| 6,694,413 B1 * | 2/2004 | Mimatsu et al. ............ 711/162 |
| 2003/0115432 A1 | 6/2003 | Bressener |
| 2003/0131278 A1 | 7/2003 | Fujibayashi |
| 2003/0140204 A1 * | 7/2003 | Ashton et al. ............ 711/162 |
| 2004/0153753 A1 * | 8/2004 | Yamaguchi et al. .......... 714/13 |
| 2004/0167972 A1 * | 8/2004 | Demmon ................. 709/219 |

OTHER PUBLICATIONS

Microsoft Computer Dictionary, 5th edition, 2002 Microsoft Press, pp. 498-499.*
Microsoft Computer Dictionary, 3rd edition, 2002 Microsoft Press, pp. 341, 430.*
Scott Bekker, "NET Framework Inches floser with Release Candidate", ENTNews Oct. 25, 2001, retrieved from the internet on Sep. 7, 2005 from www.entmag.com/ews/article.asp?EditorialsID=5043.*
Paul Robichaux, "The Volume Shadow Copy Service", WindowsITPro, Mar. 7, 2003. Retrieved from the internet on Sep. 7, 2005 from windowsitpro.com/ArticleID/38305/38305.html.*
Merriam-Webster's Collegiate Dictionary, 10th Edition, 1999 Merriam-Webster, Incorporated, p. 315.*

* cited by examiner

*Primary Examiner*—Brian R. Peugh
*Assistant Examiner*—Jesse Diller
(74) *Attorney, Agent, or Firm*—McDermott Will & Emery

(57) ABSTRACT

A system for backing up data includes a first computer configured to access a first storage device and a second computer configured to access a second storage device. In particular, the first storage device includes data to be backed up and the second storage device includes a snapshot of the data to be backed up. This system also includes a communications pathway between the first and second computers; and a backup application on the second computer which can backup the snapshot in response to a backup request initiated by the first computer.

15 Claims, 4 Drawing Sheets

SYSTEM AND METHOD TO TRANSPORT DATA SNAPSHOTS

RELATED APPLICATIONS

This application relates to and claims priority from U.S. Patent Application Ser. No. 60/365,694 filed Mar. 18, 2002, now abandoned, entitled INTELLIGENT TRANSPORT OF MIRROR VIRTUAL DISK FOR HARDWARE VSS PROVIDER, all of which is hereby incorporated by reference in its entirety.

This application also relates to a co-pending U.S. patent application Ser. No. 10/390,029, filed concurrently with this application, entitled OVERLAPPING MIRRORING METHOD AND SYSTEM FOR DATA BACKUP, all of which is incorporated by reference in its entirety.

FIELD OF THE DISCLOSURE

The disclosure generally relates to a method and system that minimize impacts on system performance during a data backup process, and more specifically, to a data backup method and system that ensure backup servers can access mirrored data.

BACKGROUND

Data backup is important to the operation of computer systems, so that important data can be recovered even after system failure or power outage. Standard data backup approaches perform full data backups on a periodic basis. This means copying primary data to a backup storage device located either locally or remotely from the computer system on which the primary data resides.

One type of data backup uses mirroring to back up data. In a mirroring process, a duplicate copy of the primary data is created on a storage device coupled to the computer system on which the primary data resides, either directly or via data transmission networks. When changes are made to the primary data, the changes are mirrored or reflected on the duplicate copy. When the mirroring process obtains a complete mirror copy of the data, the mirroring process is terminated. This mirrored data provides a "snapshot" of the original data at some particular time. A backup copy is then produced based on the snapshot obtained quickly during the mirroring process. The period between the start of the mirroring process to the end of obtaining a complete backup copy is called a backup window.

A computer or server's performance, however, will be affected by the mirroring and backup process during the backup window because numerous commands need to communicate back and forth with a storage controller coupled to the storage device. In addition, the server's access to the data being mirrored and backed up may be affected during the period when the same data is being mirrored and backed up. Thus, system administrators may prefer to utilize additional servers to perform the backup process while the primary server continues to perform its intended function. These additional servers access the snapshot information and ensure it is backed-up appropriately. Thus, the primary server, for example an online transaction system, is not required to use its resources to actually perform the backup of the data to some other storage medium.

The identification, provisioning and configuration of these additional or secondary servers are performed manually and are time consuming and error-prone. In particular, a secondary server must be configured so that it has access to the storage device where the snapshot is stored. Therefore, there is a need for an easy and automatic system to transport snapshots between servers so as to facilitate backing-up data.

SUMMARY

Embodiments of the present invention address these and other needs by providing a method which relates to performing data backup. According to this method first and second storage devices of a storage area network are maintained with a storage area network controller. A backup request from a first computer is received and, in response, a snapshot is made of selected data on a first storage device. The storage area network controller creates a virtual link from a virtual storage device to the second storage device. The second storage device which is accessible by a second computer is determined and the snapshot is copied to that second storage device. The second computer is then permitted to backup the copied snapshot form the second storage device.

Another aspect of the present invention relates to a system for creating a secondary snapshot of data to be backed up. This exemplary system includes a primary computer and a primary storage device, wherein the primary computer can generate a backup request for the data and can also communicate with a secondary computer which, itself, has access to a secondary storage device. This system also includes means for creating the secondary snapshot on the secondary storage device.

Yet another aspect of the present invention relates to a system for backing up data. This system includes a first computer configured to access a first storage device and a second computer configured to access a second storage device. In particular, the first storage device includes data to be backed up and the second storage devices includes a snapshot of the data to be backed up. This system also includes a communications pathway between the first and second computers; and a first backup application on the second computer which can backup the snapshot in response to a backup request initiated by the first computer. The first and second storage devices are included in a storage area network. The storage area network is configured to maintain the first and second storage devices, wherein the controller is further configured to establish a virtual link between the first and second devices.

As will be realized, the method and system are capable of other and different embodiments, and its several details are capable of modifications in various obvious respects, all without departing from the disclosure. Accordingly, the drawing and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

SYSTEM OVERVIEW

Figure 1:
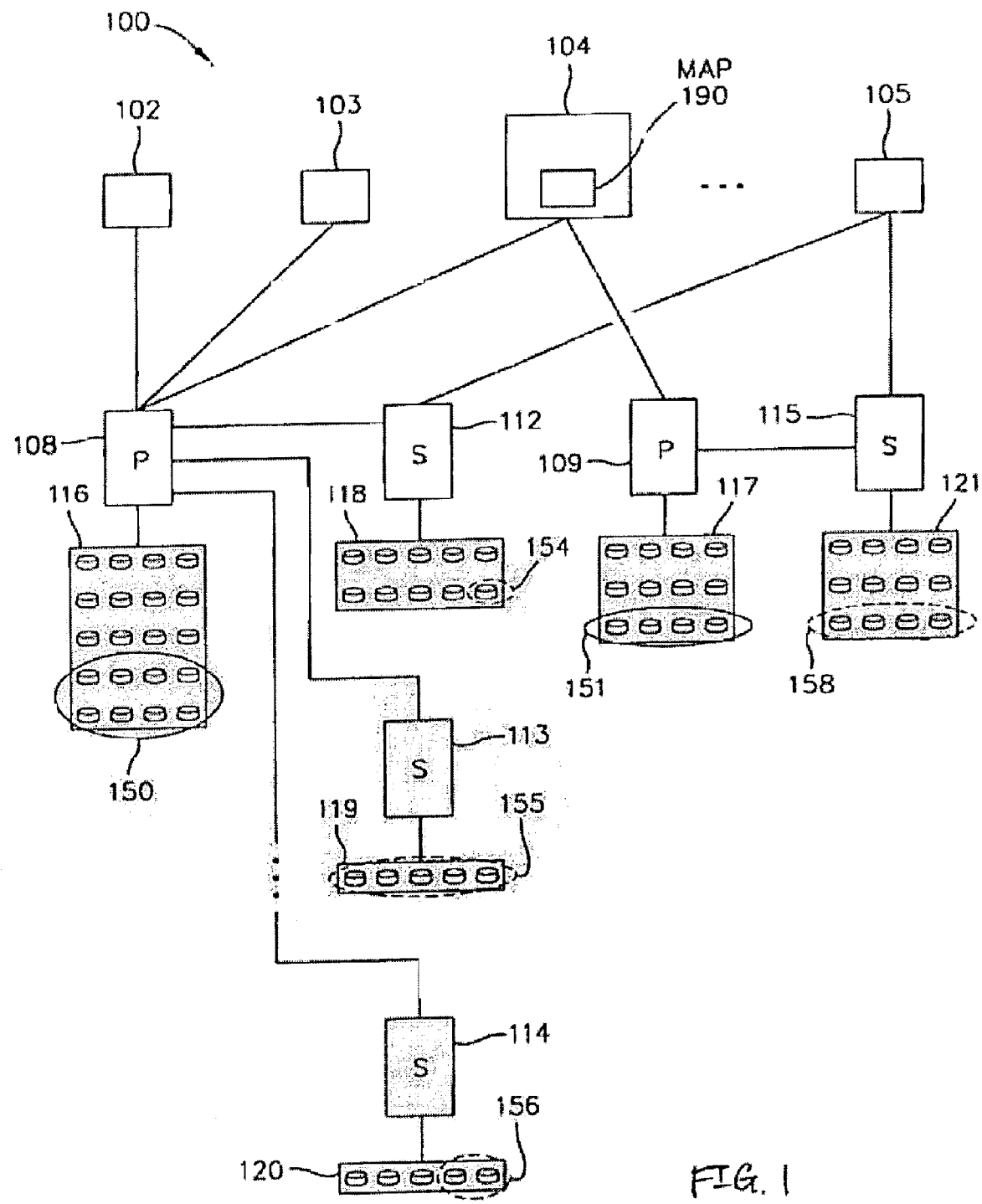
FIG. 1 shows a network system upon which an exemplary data backup method and system may be implemented.

FIG. 1 shows an exemplary network system upon which an exemplary seamless data backup method and system may be implemented. The network system includes a number of computer systems 102–105, primary controllers 108–109, and secondary controllers 112–115.

Each of the computer systems 102–105, for example, may comprise a data processing system such as a personal computer or server programmed to compute and manipulate data and execute application software. Each of controllers 108–109 and 112–115 may also comprise a data processing system such as a personal computer or server programmed to compute and manipulate data and execute application software. One example of such controllers is the XIOtech MAGNITUDE™ controller.

The number of secondary controllers 112–115 associated with each primary controller 108–109 may be increased or decreased according to the specific needs of the application. Each secondary controller 112–115 may be attached to primary controllers 108–109 via a channel such as a telephone T1/T3 line, Enterprise Systems Connection (ESCON) link, fiber optic link, computer network, long distance communications link or network, electromagnetic transmission link, or another appropriate suitable means to exchange data.

Each primary and secondary controller is coupled to data storage units such as data storage area networks (SANs). For instance, the primary controllers 108–109 are connected to data storage units 116–117, and the secondary controllers 112–115 are connected to the data storage units 118–121. Each of the data storage units may include a plurality of data storage devices, such as a redundant arrays of inexpensive disks (RAID). Other types of storage media and devices may also be used, such as optical disks, optical tape, magnetic tape, magnetic diskettes, solid state memory, or any other suitable storage medium.

When the computer systems are connected to SANs, storage spaces for the computer systems may have little, or no, correlation between the physical disk devices where data actually write to or read out from. The logical disk drive devices are targets for a computer system's data access request. One example of these SANs is the MAGNITUDE™ SAN manufactured by XIOtech Corporation.

The MAGNITUDE™ SAN aggregates physical drives into a centralized "virtualized" storage pool and has the ability to stripe across and utilize all available space in a centralized storage pool. From this pool, a user utilizes a graphical user interface to specify storage into a "virtualized disk" and assign that storage to whichever workstation that needs it. Within the SAN, the workstations see the MAGNITUDE™ SAN's virtual disks as Logical Unit Numbers (LUNs). Within MAGNITUDE™ SAN, virtualization refers to different levels of logical constructs rather than to physical storage devices (e.g., SCSI hard disk drives).

The basic MAGNITUDE™ SAN system includes up to 32 SCSI hard drives on plural SCSI busses, although an expansion box is available to double the system size. A configurable number of virtual disks and virtual RAID devices (or arrays) are arranged across these drives. A virtual disk can comprise one or more of the virtual RAID devices. Each of these virtual disks are presented to one or more remote workstations on a Fibre Channel network as an addressable disk drive that appears and acts like local storage (i.e., an available local drive).

A particular feature of the MAGNITUDE SAN™ useful in embodiments of the present invention is known in the industry as "virtual link". This capability permits a first MAGNITUDE SAN™ controller (the source controller) and a second MAGNITUDE SAN™ controller (the target controller) which are connected by a communications link to manage a single storage device. The user interface to the source controller permits the creation on the source controller of a logical volume which is designated as a virtual link. This designation as a virtual link includes identification of the target controller and creation of a virtual disk on the target controller. A server utilizing the logical volume on the source controller will access that volume like every other logical volume on the source controller. However, the creation of the virtual link results in the source and target controllers coordinating data transfers, without awareness by any server, such that data is physically stored on and physically read from storage devices attached to the target controller. The physical storage devices attached to the source controller are not used to read or write the data even though it appears to the server that the source controller is being utilized.

In embodiments of the present invention, the source controller receives, from a server, an indication to backup a dataset and initiates a mirroring process to create a snapshot of the dataset. When the source controller initializes the mirror location it designates a virtual link rather than a typical logical volume. Thus, the server interacts with the source controller as typically required to initiate a backup process but the virtual link results in the snapshot being located on a logical disk implemented on physical devices under the control of a target controller.

Each computer system 102–105 provides substantial computing power for running application programs, such as backup software applications and database management applications. Storage controllers 108–109/112–115 provide the subsidiary functions necessary to efficiently transfer, stage/destage, convert, and generally access data stored in the data storage units.

The arrangement of FIG. 1 may be configured to store a database, such as an IBM DB2 database, in one of the data storage units (e.g., 116) as a primary storage site and to store a mirror copy of the database on a second data storage unit as the secondary site, wherein the secondary site is separated from its primary site by a distance of feet, kilometers, or even thousands of kilometers, depending upon the user's desired level of protection. In addition to providing a backup copy, the secondary sites also have access to enough system information to take over processing for the primary site if the primary site becomes disabled.

Alternatively, the primary storage site and/or the secondary storage site may be distributed over several data storage units or devices. The primary storage site and the secondary storage site may also be in the same data storage unit, even on the same data storage device.

In the case where the database storage is distributed, the primary controllers 108–109 cooperatively share management of the primary database, spread across the primary data storage units 116–117. The primary database is contained on the primary devices 150–151. As illustrated, the primary database is mirrored by a secondary database, contained in the data storage units 118–121.

The allocation of backup data corresponding to the primary database is stored in an allocation map 190 maintained by computer system 104. For each primary database, the allocation map 190 specifically identifies the primary devices containing some or all of that database; the allocation map 190 also cross-references each primary device to its mirroring secondary device. For instance, in the case of the illustrated primary database, the allocation map 190 indicates that the primary database is stored on the devices 150–151, with the corresponding secondary database being stored on the secondary devices 154–156 and 158. Preferably, the allocation map 190 also works in reverse, where a specific secondary device can be indexed to identify the primary databases it mirrors.

Detailed descriptions of networked data storage system may also be found in U.S. patent application Ser. No. 10/183,950, filed Jun. 28, 2002, titled "System and Method to Elect Master Device Among Redundant Peers," assigned to the assignee of the present application, which is incorporated herein by reference in its entirety.

Figure 2:
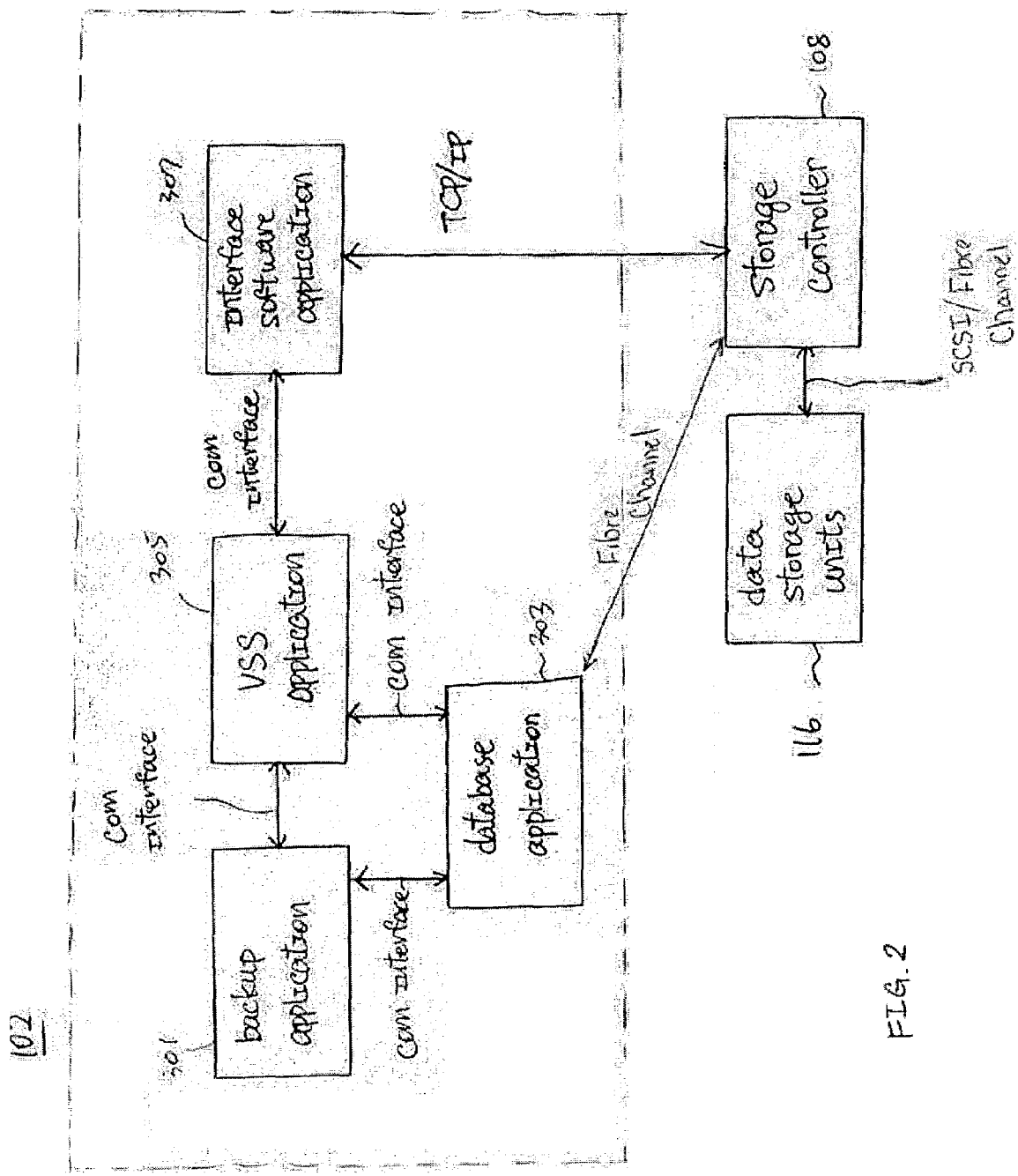
FIG. 2 depicts a functional block diagram of an exemplary data backup system according to an embodiment of the present invention.

FIG. 2 is a functional block diagram of an exemplary data backup system according to embodiment of the present invention. Operations of the exemplary data backup method and system will be described along with the network system depicted in FIG. 1. One of the computer systems, such as 102, maintains at least one database by running a database software application 303, such as Microsoft SQL Server, Oracle database, IBM DB2, Lotus Notes, Microsoft Exchange or the like.

The computer system 102 also runs a backup software application 301, such as Ntbackup or Verites Backup Exec, to back up the database periodically. The computer system 102 runs an operating system that supports Microsoft .NET framework, such as Windows XP. The .NET framework supports a function called Volume Shadow Copy Service (VSS). VSS is a feature introduced in XP and .NET platform, VSS allows creating point-in-time copies of application data while application software is operating. VSS includes generally the following components:

Provider: a piece of interface software application running on a .NET server to communicate with a storage subsystem to initiate snapshots of data.

Writers: a shim layer in a software application, such as the database application running on the computer system 102, to freeze/re-start application read/write activities.

Requestor: usually is a backup application running on the server to ask for data backup.

Windows XP includes a VSS program 305 to support VSS functions. The computer system 102 may also run an operating system that does not support .NET framework. In that case, a proprietary software program that provides functions similar to those of VSS program 305 can be used.

The computer system 102 runs an interface software application 307 (the provider) such that the system may directly communicate with the storage controllers. The interface software application 307 works as the provider. In one embodiment, computer system 102 does not store the database, or the data to be backed-up, on its local disk drive. Instead, the database is stored in one of the storage units (e.g., 116). As discussed earlier, the database may, of course, be distributed in several storage devices or storage units.

The VSS architecture within Windows XP permits snapshots to be "transported" between servers. In other words, a snapshot initiated by one server can be re-assigned to another server so that the other server can access the snapshot. In this way, the computer system 102 can initiate a backup of selected data so as to create a snapshot but a secondary server can perform the actual back-up of that snapshot, thus freeing the resources of the computer system 102.

In operation, computer system 102, by running the backup software application 301, periodically initiates a backup request to the storage controller 108 to initiate backup of the database. In response, the database is mirrored by using a virtual disk managed by the storage controller 108. Changes made to the primary database are reflected on the mirrored database. Whenever an I/O command is issued to write data to the database, the computer system 102 communicates with the storage controllers to initiate corresponding actions on the primary and mirrored databases. Once the mirror, or snapshot, is complete, the backup software application 301 and VSS Application 305 coordinate the transport of the snapshot to a different computer system (e.g., 103). It is this different computer system which performs the data backup.

Figure 3:
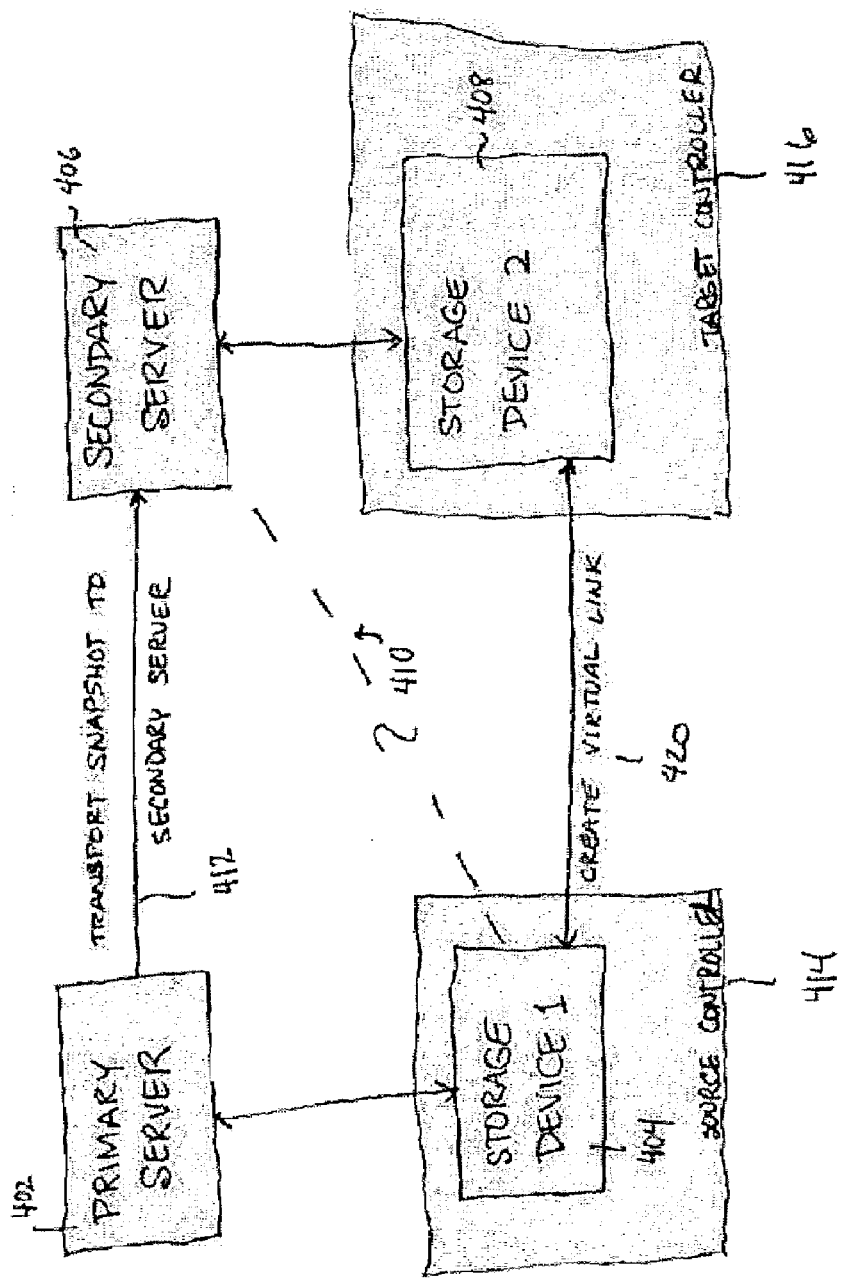
FIG. 3 illustrates the operation of transporting a snapshot between servers according to an embodiment of the present invention.

However, one concern of this arrangement is depicted in FIG. 3 via the dashed line 410. The primary server 402 will be configured to have access to the storage devices 404 of a source controller 414. Similarly, the secondary server 406 will be configured to have access to the storage devices 408 of a different, target controller 416. Under typical operation, the backup software application 301 (see FIG. 2) will create the snapshot of the data on the storage device 404. While the VSS Application 305 may successfully effect transport 412 of the snapshot to the secondary server 406, the backup will fail if the secondary server 406 cannot access the storage device 404. Thus, unless an access path 410 is configured for the secondary server 406, the snapshotted data will not be successfully backed-up.

As explained below with respect to FIG. 4, a virtual link 420 between the source controller 414 and target controller 416 is used in embodiments of the present invention to ensure a snapshot is located on a storage device 408 which is accessible by the secondary server 406.

SYSTEM OPERATION

Figure 4:
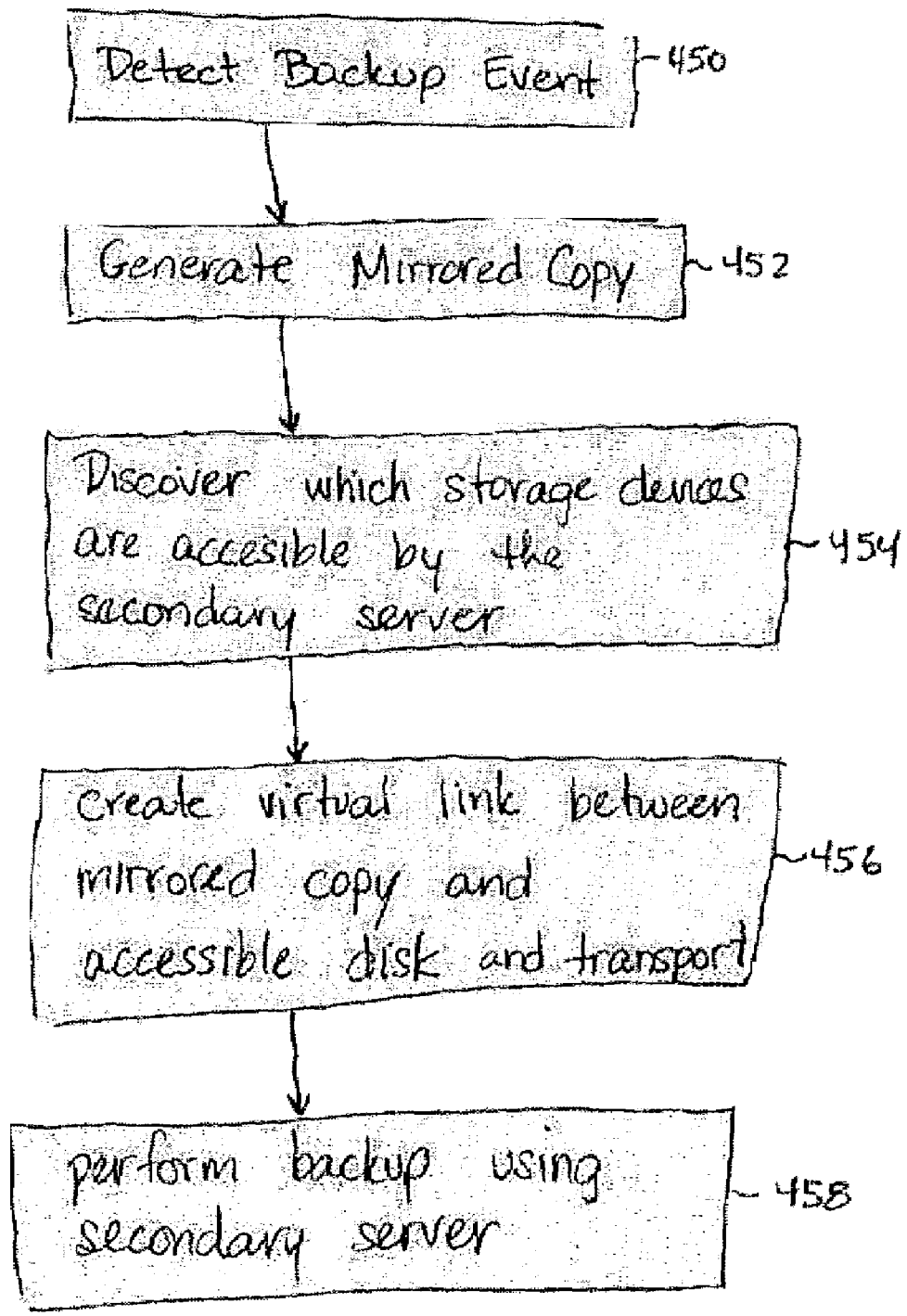
FIG. 4 shows an exemplary algorithm for determining how to transport a snapshot according to an embodiment of the present invention.

The flowchart of FIG. 4 illustrates an exemplary method for accomplishing data backup according to embodiments of the present invention. Reference is made to earlier figures to assist in understanding the logical flow of FIG. 4. In operation, the primary server 402, by running the backup application 301, periodically issues a backup request to controller 414 to backup selected data. The backup event is detected in step 450 by the controller 414.

In response to the backup request, a mirroring process is initiated by the storage controller 414 and will typically generate (step 452) a mirrored copy of the selected data on a storage device determined by the controller 414.

The VSS Application 305 will, according to its configuration information, determine a secondary server 406 to which to transport the snapshot. The interface software application 307, also known as the VSS provider, receives from the VSS Application 305 the identity of the secondary server 406. Using this information, the interface software application 307, in step 454, queries the controller 414 to discover which storage devices are accessible by the secondary server 406. Choosing from only these accessible storage devices, the controller 414 creates a virtual link (step 456) between the mirror location on the original storage device 404 and a second storage device 408. Through the virtual link, a mirroring process on controller 414 will cause data to be mirrored to a second storage device 408 under the control of the target controller 416.

Upon completion of the mirrored copy, a snapshot will exist on storage device 408 that can be backed-up. As explained, the creation of this snapshot using a virtual link causes a copy of the snapshot to be created on the second storage device 408 (which is accessible by the secondary server 406). Therefore, when the secondary server 406 tries to backup the snapshot in step 458, it will be assured access to the snapshot which is on the second storage device 408.

The disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A method for performing data backup comprising the steps of:
    maintaining first and second storage devices of a storage area network with a storage area network controller;
    receiving a backup request from a first computer;
    determining the second storage device accessible by a second computer;
    creating with the storage area network controller a virtual link from a virtual storage device to the second storage device;
    generating, on the virtual storage device, a snapshot of a dataset on the first storage device; and
    permitting the second computer to backup the snapshot.

2. The method according to claim 1, wherein the step of generating further includes the steps of initiating a mirroring process in response to the backup request and terminating the mirroring process when complete.

3. The method according to claim 1, wherein the step of creating includes the step of creating a virtual link between the first and second storage devices.

4. The method according to claim 1, further comprising the step of:
    transporting the snapshot from the first storage device to the first computer and to the second computer.

5. The method according to claim 4 further comprising the step of:
    providing a software framework configured to perform the step of transporting.

6. The method according to claim 1, further comprising the step of:
    providing a software interface application on the first computer configured to perform the step of determining.

7. A system for backing up data comprising:
    a first computer configured to access a first storage device, wherein said first storage device includes data to be backed up;
    a second computer configured to access a second storage device, wherein said second storage device includes a snapshot of the data to be backed up, and wherein the first and second storage devices are included in a storage area network;
    an interface application executing on said first computer and configured to determine an identification of storage devices accessible by the second computer;
    a communications pathway between the first and the second computer;
    a first backup application on the second computer configured to backup the snapshot in response to a backup request initiated by the first computer; and
    a storage area network controller configured to maintain the first and second storage devices, wherein the controller is further configured to establish a virtual link between the first and second storage devices.

8. The system of claim 7 wherein the first and second storage devices are virtual disks.

9. The system of claim 7 wherein:
    the interface application executing on said first computer and configured to receive from the controller the identification of storage devices accessible by the second computer.

10. The system according to claim 7, wherein:
    the first computer includes a second backup application configured to generate the backup request;
    the first computer includes a software interface configured to directly communicate with a storage subsystem which includes the first and second storage devices; and
    the first computer includes an operating system configured to exchange commands between the second backup application and the software interface.

11. The system according to claim 10, wherein the operating system is .NET compliant.

12. The system according to claim 10, wherein the operating systems includes Volume Shadow Copy Service.

13. A system for backing up data comprising:
    a first computer configured to access a first storage device, wherein said first storage device includes data to be backed up;
    a second computer configured to access a second storage device, wherein said second storage device includes a snapshot of the data to be backed up, and wherein the first and second storage devices are included in a storage area network;
    a communications pathway between the first and the second computer;
    a first backup application on the second computer configured to backup the snapshot in response to a backup request initiated by the first computer; and
    a storage area network controller configured to maintain the first and second storage devices, wherein the controller is further configured to establish a virtual link between the first and second storage devices, wherein:
    the first computer includes a second backup application configured to generate the backup request;
    the first computer includes a software interface configured to directly communicate with a storage subsystem which includes the first and second storage devices; and
    the first computer includes an operating system configured to exchange commands between the second backup application and the software interface.

14. The system according to claim 13, wherein the operating system is .NET compliant.

15. The system according to claim 13, wherein the operating system includes Volume Shadow Copy Service.

* * * * *